Figure 1:
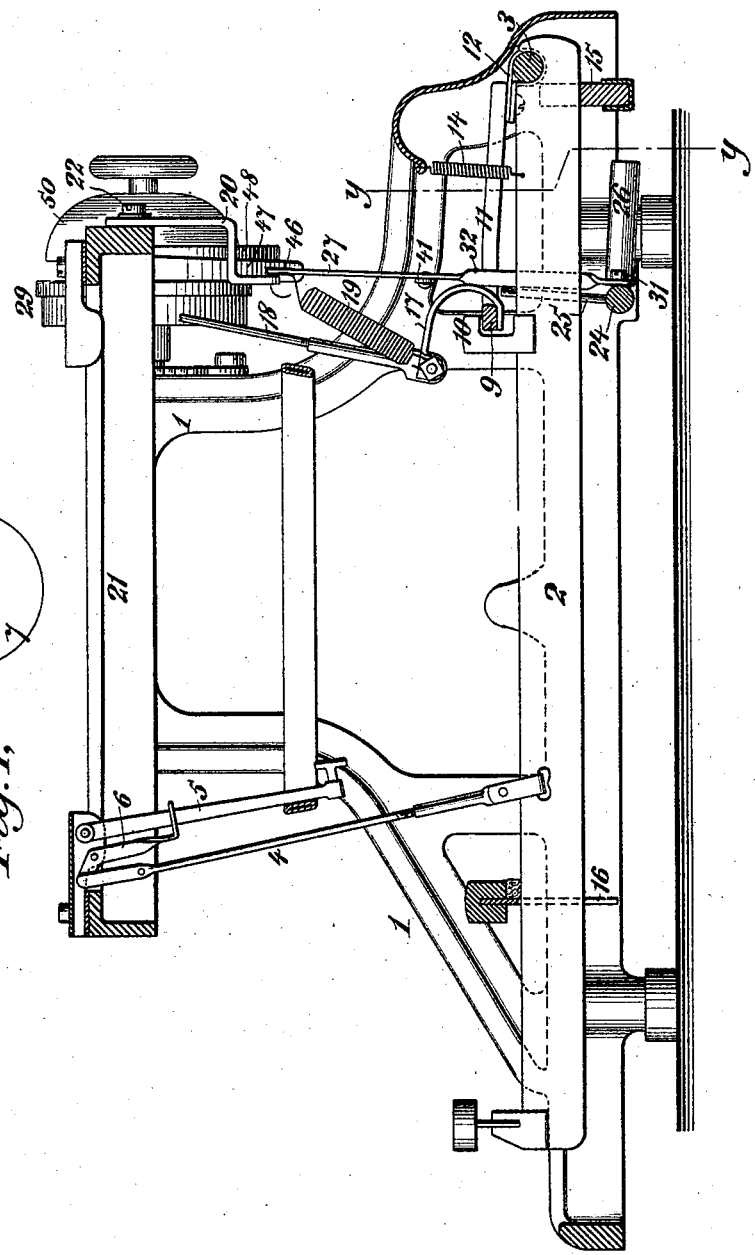

(No Model.)

H. W. MERRITT.
TYPE WRITING MACHINE.

No. 574,159.   Patented Dec. 29, 1896.

WITNESSES:
D. H. Haywood
I. C. MacDonald

INVENTOR
Henry W. Merritt
BY
Jacob Felbel
ATTORNEY (No Model.) 2 Sheets—Sheet 2.
H. W. MERRITT.
TYPE WRITING MACHINE.
No. 574,159. Patented Dec. 29, 1896.
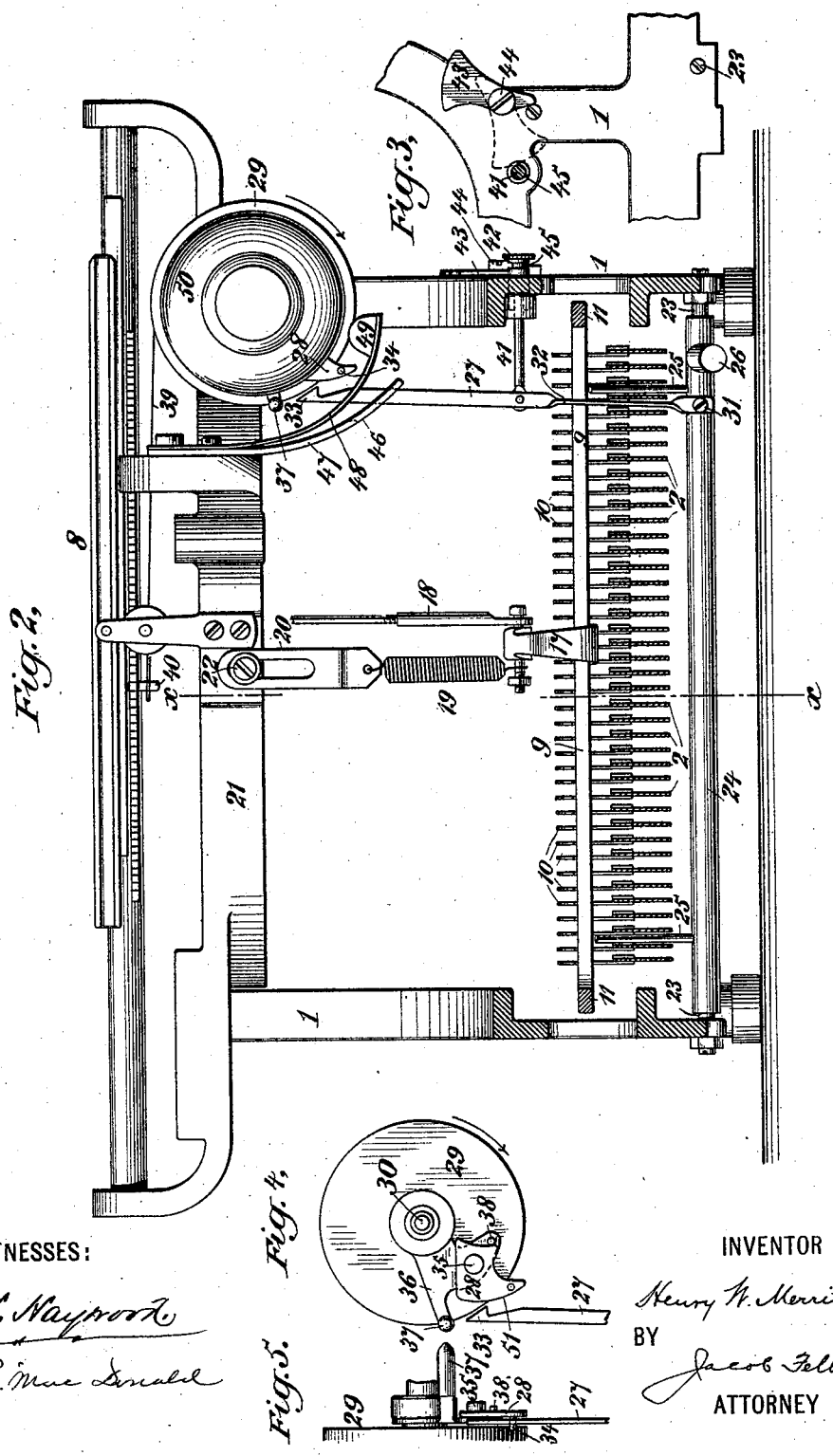
WITNESSES:
INVENTOR
Henry W. Merritt
BY
Jacob Felbel
ATTORNEY

UNITED STATES PATENT OFFICE.

HENRY W. MERRITT, OF SPRINGFIELD, MASSACHUSETTS, ASSIGNOR TO THE MERRITT MANUFACTURING COMPANY, OF SAME PLACE.

TYPE-WRITING MACHINE.

SPECIFICATION forming part of Letters Patent No. 574,159, dated December 29, 1896.

Application filed May 29, 1894. Serial No. 512,893. (No model.)

*To all whom it may concern:*

Be it known that I, HENRY W. MERRITT, a citizen of the United States, and a resident of Springfield, in the county of Hampden and State of Massachusetts, have invented certain new and useful Improvements in Type-Writing Machines, of which the following is a specification.

My present improvements in type-writing machines relate to what is known as "line-locks;" that is to say, contrivances for preventing the types from printing after the end of the line has been reached and the carriage has come to a stop.

My invention has for its main objects to provide simple and effective line-locking mechanism, together with means for enabling the addition of one or more characters to the line after the line-locking mechanism has been actuated.

To these ends my invention consists in certain features of construction and combinations of devices, all as will be hereinafter more fully described, and particularly pointed out in the appended claims.

In the accompanying drawings, Figure 1 is a vertical longitudinal section, taken at the line *x x* of Fig. 2, of a type-writing machine embodying my improvements. Fig. 2 is a rear sectional elevation taken at the line *y y* of Fig. 1. Fig. 3 is a partial side view showing the push-rod latch. Fig. 4 is a face view of the spring-drum, the adjustable line-locking catch, and the upper portion of the hooked rocker-rod, the gong on the spring-drum shaft being omitted; and Fig. 5 is an edge view of the same.

In the several views the same part will be found designated by the same numeral of reference.

The machine shown is that known as the "Densmore," to which in practice I have applied my improvements; but it will of course be understood that the latter may be embodied in other styles or makes of machines.

1 designates the framework of the machine; 2, the key-levers, fulcrumed at 3 at the rear of the machine; 4, the connecting-rod; 5, the type-bar; 6, the intermediate type-bar-lifting lever, and 7 the platen, shown in section only and detached from the usual paper-carriage, a portion of which latter is represented at 8, Fig. 2.

9 represents a universal bar which extends crosswise above the key-levers proper, but underneath a series of hooks 10 on said key-levers. The universal bar at its ends contiguous to the side frames is connected by side arms 11, extending rearwardly, and straps or hinges 12 to the transverse fulcrum-bar 3, whereby said universal bar may have an up-and-down vibratory movement about said fulcrum-bar as a center. Each key-lever is provided with a coiled returning-spring 14, and to guide the levers and hold them in place laterally the machine is provided with transverse combs or slotted bars 15 and 16.

Centrally of the universal bar is attached one end of a curved arm 17, to whose other end is pivotally connected at one side an adjustable connecting-rod 18, the upper end of which is attached to the letter-spacing dogs. (Not shown.) At the other side of said arm 17 is attached the lower end of a coiled spring 19, the upper end of which is attached to an adjustable plate 20 for varying the tension of said spring, the said plate being slotted and fastened to the top plate 21 of the machine by a screw 22. The spring 19 serves to return the universal bar to its normal position.

Beneath the key-levers and journaled at 23 on pins extending inward from the side frames is a rock-shaft 24, which near each end is provided with an upright pin or arm 25 and which at one end is also provided with a rearwardly-extending weight 26. The pins 25 extend up to nearly the height of the universal bar and are adapted, when the rock-shaft 24 is turned in one direction, to swing underneath said universal bar and thereby prevent the latter from being pulled down or actuated by the key-levers. The said pins, however, are kept normally out of the path of the universal bar by the weight 26, for which, of course, a spring may be substituted. The rock-shaft is oscillated and the pins thrown into the path of the universal bar by means of a vertically-arranged rod 27 and a rotatory catch 28, which turns with the spring-drum 29 and is adjustable on the shaft or axis 30 thereof.

The lowermost end of the rod 27 is attached by a screw 31 on the rear side of the rock-shaft and between its ends is given a half-twist, as at 32, to form an integral spring for said rod, which latter at its uppermost end is provided with a hook 33, adapted to be engaged by a laterally-extending pin 34 on the catch-plate 28, whereby the said rod is lifted, the rock-shaft oscillated, and the pins swung over into the path of descent of the universal bar.

The catch-plate 28 is pivoted at 35 upon an arm 36, that is frictionally held upon the shaft or axis of the spring-drum, so that by means of its handle 37 it may be moved thereabout independently of the spring-drum to any desired position in order to adjust the catch-plate to effect the line-locking at any desired point of travel of the paper-carriage.

38 is a stop-pin on the arm 36, which prevents the catch-plate from swinging independently when the pin 34 engages with the hook of the rocker-rod 27.

39 designates the driving strap or band, which, as usual, is connected at one end to the spring-drum and at its other end to the paper-carriage at 40.

The spring 32, formed integral with the rod 27, has a natural tendency to press the hooked end of the rod toward the spring-drum, and hence keep it normally in the path of rotation of the pin on the catch-plate, but for the purpose of disengaging the hook and the catch-plate after the locking of a line a horizontally-arranged push rod or pin 41 is provided, said rod or pin being connected at its inner end to the rocker-rod and, passing through a sliding bearing in the framework, provided at its outer end with a push button or head 42, which when pressed inwardly serves to move the hook away from the catch and permit the addition of one or more letters or other characters to the line after the line has once been locked. Upon removing the pressure from this button or head the spring 32 will return the rods 27 and 41 to their first positions. When, however, it may be desired to dispense entirely with the line-locking mechanism, the push-rod 41 may be pressed inwardly to move the hook 33 out of the path of the pin 34, and a latch 43, pivoted at 44 upon the framework, may be thrown down to the dotted-line position shown at Fig. 3 to engage a peripheral groove 45 in the rod 41 and hold it and the rocker-rod against the tension of the spring 32 and the hook 33 in a position where it cannot be reached by the catch-pin during its rotative movements.

The upper portion of the rod 27 passes through a slot 46 in a downwardly-extending bracket 47, to which is connected the spring-shank 48 of a gong-hammer 49, adapted to strike the gong 50 on the spring-drum shaft or hub.

The catch-plate performs the additional function of a bell-hammer trip and, being adjustable, may be arranged to give the alarm at any desired point in the travel of the paper-carriage. The curved edge 51 of the catch-plate in passing over the hammer depresses it, and when the point of the catch-plate slips off or over the top of the hammer the spring 48, flexed in the depressing movement of the hammer, immediately throws the latter up to strike the gong.

From the foregoing description and from that which now follows it is believed that the mode of operation of the mechanism will be readily understood by those skilled in the art.

If it be desired to lock the type-bars, for example, say at "50," on the usual machine-scale, the carriage is moved until the usual pointer registers with "50" on said scale. Then by means of the handle 37 the catch-plate is swung around until the pin 34 has engaged the hook 33, raised the rod 27, rocked the shaft 24, and thrown the pins 25 under the universal bar. When this has been done, the rod 41 is pushed in to disengage the hook and pin. Thereafter on each line of the writing when the pointer registers with "50" on the scale the type-bars will have been locked and no further impression can be made or movement of the carriage occur unless the operator should specially desire it and actuate the push-rod 41. If the latter be done, then the carriage may travel to the full end of the line and additional characters may be printed.

It will be understood, of course, that whenever the hook and the pin are disengaged, either by pushing in the rod 41 or by moving the carriage toward the right for the beginning of a new line, (during which the spring-drum and the catch-plate rotate in a direction opposite to that indicated by the arrow,) the weight 26 operates immediately to rock the pins, stops, or abutments 25 back out of the path of the universal bar, in order that the type-bars and escapement devices may be actuated at once for the continuance of the printing.

The catch-plate 28, being independently pivoted, as shown, is free to swing or bob idly over the gong-hammer on the return movement of the carriage and also over the top beveled end of the hook 33 in case said catch-plate should be above the hook at the time of returning the carriage; but it will be understood that when the catch-plate is moving in the opposite direction (during the travel of the carriage in printing) by reason of the pin 38 it works rigidly and affects or actuates both the gong-hammer and the line-locking mechanism.

While I have shown and prefer to use the universal bar as the locking-bar for the key-levers, I do not wish to be understood as limiting myself entirely to the use of this bar for that purpose, as it is obvious that the bar 9 may be simply and solely a locking-bar and another bar be employed either above or below the key-levers for the universal bar.

Various changes in details of construction and arrangement may be made without departing from the gist of my several improvements, and it will of course be understood that while I have made the catch-plate perform the two functions of a gong-hammer trip and a line-locking actuator I do not wish to be confined to a device performing these two offices.

In the subjoined claims where I refer to the element of a weight I wish to be understood as including its well-known equivalent, a spring, and hence as not limiting myself specifically to the weight.

What I claim as new, and desire to secure by Letters Patent, is—

1. In a type-writing machine, the combination with the paper-carriage, the driving mechanism therefor, the types, and the key-levers, of a locking-bar arranged transversely of the key-levers and movable therewith, a transverse rock-shaft provided with intercepting means adapted to be moved into the path of said locking-bar, and also provided with means for maintaining said intercepting means normally out of the path of said locking-bar, a vertical longitudinally-movable rocker-rod, and a rotatory actuator therefor carried by the carriage-driving mechanism; substantially as described.

2. In a type-writing machine, the combination with the paper-carriage, the driving mechanism therefor, the types, and the key-levers, of a transversely-arranged locking-bar normally movable with the key-levers, a rock-shaft provided with one or more stops or abutments and with a weight, a rocker-arm provided at its upper end with a hook, and a rotatory catch-plate to engage said hook, rock said shaft, and throw said stops or abutments into the path of the locking-bar and thus prevent depression of the key-levers and movement of the types to the paper.

3. In a type-writing machine, the combination with the paper-carriage, the driving mechanism therefor, the types, and the key-levers, of a transversely-arranged locking-bar movable with the key-levers, a rock-shaft provided with one or more stops or abutments to intercept said locking-bar, and with a weight to maintain said stop or stops normally out of the path of the locking-bar, a rocker-rod attached at one side of the line of pivots of said rock-shaft and having a longitudinal and also a vibratory motion and a rotatory catch traveling with the spring-drum adapted to move said rocker-rod; substantially as described.

4. In a type-writing machine, the combination with the paper-carriage, the driving mechanism therefor, the types, and the key-levers, of a transversely-arranged locking-bar, a rock-shaft provided with one or more stops or abutments and with a weight, a rocker-rod provided with a spring and having a hook at its upper end, a rotatory catch-plate provided with a pin, and means for disengaging the hook and the pin after the line-locking operation.

5. In a type-writing machine, the combination with the paper-carriage, the driving mechanism therefor, the types, and the key-levers, of a transversely-arranged locking-bar, a rock-shaft provided with one or more stops or abutments, and with a weight, a rocker-rod, a rotatory catch adapted to lift said rod, and a push-pin connected to said rod for effecting its disengagement from the said catch.

6. In a type-writing machine, the combination with the paper-carriage, the driving mechanism therefor, the types, and the key-levers, of the transversely-arranged locking-bar, a rock-shaft provided with one or more stops or abutments and with a weight, a vertically-arranged rocker-rod having a spring and a hook, a rotatory catch, a push-pin connected to said rod, and a latch for holding said hook normally out of the path of rotation of said catch.

7. In a type-writing machine, the combination with the paper-carriage, the driving mechanism therefor, the types, and the key-levers, provided each with a hook, of a universal bar extending transversely over the key-levers and under the key-lever hooks, one or more rocking stops or abutments normally out of the path of said universal bar, a rock-shaft, a rocker-arm, and a rotatory catch to engage said rod and rock said stops or abutments underneath the universal bar at the end of the predetermined line.

8. In a type-writing machine, the combination with the paper-carriage, the driving mechanism therefor, the types, and the key-levers, each provided with a hook, of a universal bar arranged above the plane of the key-levers but beneath the key-lever hooks, the underlying rock-shaft provided with one or more stops or abutments and with a weight, a vertically-arranged spring-pressed rocker-rod having a hook at its upper end, a rotatory, adjustable catch connected to the carriage-driving mechanism, and means for disengaging said catch and said hook at the end of a line for the purpose of adding one or more characters thereto.

9. In a line-locking mechanism, the combination of a universal bar normally actuated by the key-levers, a rock-shaft provided with one or more stops or abutments for said universal bar and also with means for maintaining said stops or abutments normally out of the path of movement of said universal bar, a vertically-arranged rocker-rod, and means for lifting said rod and causing said stops or abutments to swing in the path of movement of said universal bar.

10. In a line-locking mechanism, the combination of a universal bar, the rock-shaft having one or more stops or abutments, the weight, the vertically-arranged rocker-arm, the catch therefor connected to the carriage-driving mechanism and adjustable thereon to effect the swinging of the stops or abutments into the path of movement of the universal bar at any desired point of travel of the paper-carriage.

11. In a line-locking mechanism, the combination of the universal bar, the rock-shaft, the stops or abutments, and the weight thereon, the rocker-rod, the adjustable arm 36 connected to the carriage-driving drum and carrying a pivoted catch-plate to engage with and lift said rocker-arm.

12. In a type-writing machine, the combination with the paper-carriage, the driving mechanism therefor, the types, and the key-levers, of a universal bar, a rock-shaft provided with one or more stops or abutments and with a weight, a vertically-arranged rocker-rod provided with a hook, a gong connected to the carriage-driving mechanism, a spring-actuated gong-hammer, and the adjustable member 28 adapted both to actuate the gong-hammer and also the stops or abutments.

Signed at Springfield, in the county of Hampden and State of Massachusetts, this 26th day of May, A. D. 1894.

HENRY W. MERRITT.

Witnesses:
J. G. DUNNING,
H. A. BOOTH.